United States Patent [19]

Gorkiewicz

[11] 4,371,222
[45] Feb. 1, 1983

[54] RETRACTABLE SCISSORS TONG MECHANISM

[76] Inventor: Mitchell F. Gorkiewicz, 419 E. Sixth St., Royal Oak, Mich. 48067

[21] Appl. No.: 185,339

[22] Filed: Sep. 8, 1980

[51] Int. Cl.³ ............................................. A47G 29/00
[52] U.S. Cl. ................................. 312/211; 312/212; 312/246; 312/294; 248/277; 248/298
[58] Field of Search ............... 312/211, 194, 294, 212, 312/246; 160/342; 248/277, 167, 298, 324, 421

[56] References Cited

U.S. PATENT DOCUMENTS

| | | | |
|---|---|---|---|
| 475,056 | 5/1892 | Hall | 248/277 |
| 495,546 | 4/1893 | Ebert | 248/277 |
| 586,881 | 7/1897 | Taubert | 248/277 |
| 918,000 | 4/1909 | Burdick | 248/277 |
| 1,011,725 | 12/1911 | Benham et al. | |
| 1,095,844 | 5/1914 | Garrecht | 248/325 |
| 1,215,261 | 2/1917 | Dyke | |
| 1,602,261 | 10/1926 | Hill | |
| 1,779,827 | 10/1930 | Reed | 248/277 |
| 2,602,506 | 7/1952 | Ruskin | 248/277 |
| 2,774,182 | 12/1956 | Beder | 248/298 |
| 2,968,520 | 1/1961 | Ahrens | 312/246 |
| 3,397,749 | 8/1968 | Haskins et al. | 248/325 |
| 4,111,506 | 9/1978 | Gorkiewicz | 312/211 |

Primary Examiner—Victor N. Sakran
Attorney, Agent, or Firm—Gifford, VanOphem, Sheridan and Sprinkle

[57] ABSTRACT

A retractable scissors slave tong mechanism supported within a cabinet or the like. A mechanism is used to support or carry a wastebasket or similar item such that it is movable between an inner first position and an outer extended position which accesses the wastebasket or similar item for the user. An actuating mechanism is provided in coordination with a novel support mechanism such that very little force is required to extend the carrier even with a fully loaded wastebasket, container, or similar item. The actuating mechanism moves a single section of the slave tong thereby forcing all sections of the slave tong to actuate and extend the carrier or support in multiples of the distance of the actuating mechanism movement.

11 Claims, 7 Drawing Figures

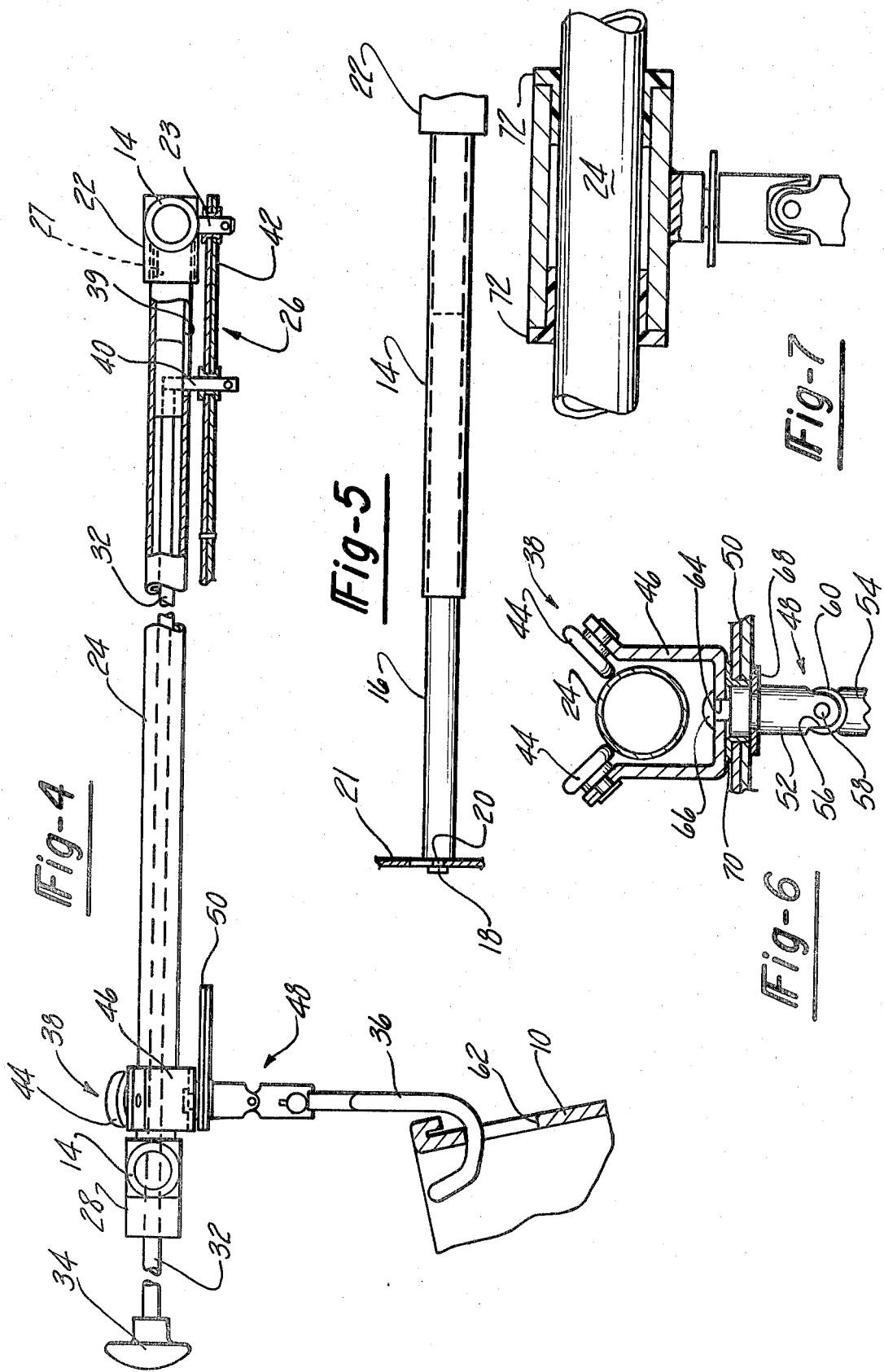

RETRACTABLE SCISSORS TONG MECHANISM

BACKGROUND OF THE INVENTION

I. Field of the Invention

The present invention relates to retractable mechanisms and supports for containers associated therewith, including scissors tong type mechanisms and wastebaskets associated therewith.

II. Description of the Prior Art

Many containers used for storage or waste are frequently placed upon the floor. These containers usually have a relatively short period of usage during the work day and are otherwise often cumbersome and inconveniently located. Such containers include tool bins, storage bags, wastepaper baskets, hampers, and similar items. Although it is necessary to have such a container handy for occasional use, it is nevertheless usually an obstruction when not being used.

In the past, it has been proposed to use the space between the supporting legs of a desk, for example, and similar recesses to position such containers in a spot that is both convenient and not cumbersome. However, if the basket or similar container is positioned in a recess of a desk or cupboard, then it must frequently be moved to deposit items therein. As a solution to that problem, I devised my invention which is described in U.S. Pat. No. 4,111,506 for carrying a wastebasket or similar item into and out of the recess of, for example, a desk or cupboard. Any item having a storage area or housing large enough to conveniently hold the container is suitable for use with that invention.

The invention described in my earlier U.S. patent has proven to be very effective but has some shortcomings which I have overcome by the present invention described below. My previous invention moves a wastebasket or similar item by means of a roller along a tiltable hanger bar. The degree of pressure necessary to move the basket along the hanger rod is somewhat greater than desired. Furthermore, positioning the basket in an intermediate position between fully recessed and fully forward is difficult with the invention of U.S. Pat. No. 4,111,506. Also, the installation of the device is somewhat more difficult where the space or housing within the cabinet or desk is somewhat restricted. Finally, the wastebasket was movable only from a forward to a recessed position and back without allowing for any reorientation of the basket relative to the housing. Thus, the depositing of items in the container was difficult in some circumstances.

SUMMARY OF THE INVENTION

The present invention overcomes the problems in the prior art with positioning of containers. By my present invention, I have provided an apparatus for moving a container to various positions between the front and rear of a housing in a desk, cupboard, or similar item having a housing large enough for the container. I have provided a guide rail extending from the rear of the housing of a desk or similar item, said guide rail being supported by mounting means attached to the structure of the housing. In addition, I have provided a support for a container on the guide rail and means for extending the support on rollers along the guide rail, the position of which is controlled by a scissors tong or similar mechanism. Such mechanisms are also referred to herein as trivet mechanisms.

My inventive device makes office cleaning easy since there is no unnecessary handling of wastebaskets and similar containers. The basket is conveniently suspended above the floor and saves janitorial time. The device allows arrangements of office furniture which would not otherwise by possible and saves expensive floor space.

An actuating rod is disposed in the guide rail or closely adjacent thereto and acts upon one of the sections of the scissors tong mechanism to expand and contract that section. Since the other scissors tong mechanisms are connected between the rear of the housing and the support for the container, they likewise extend and contract with the control section. Therefore, it becomes possible to move the container supports and container from the rear of the housing to the front of the housing while moving the actuating rod or mechanism only a fraction of that distance.

My device has a smooth carrying ratio of about 6 to 1; i.e., it takes only a two pound pull on the actuator of the device to carry a twelve pound basket and payload.

Thus, by the apparatus of the present invention, the basket may be moved to any of various positions along the guide rail with only a slight degree of pressure and with very little inconvenience to the user. In this manner, a wastebasket or similar container is readily accessible and positioned for the convenience of the user to deposit trash or other items in the container.

It is, therefore, an object of the present invention to utilize previously unused space under a desk with a container support mechanism capable of moving the container from a recessed to a forward position.

It is also an object of the present invention to provide a trivet mechanism for moving a container or similar item to various positions along a guide rail mounted in a housing.

It is also an object of the present invention to provide a universal hanger mechanism which allows reorientation of a container along various positions of a guide rail mounted in the housing.

It is also an object of the present invention to provide a smoothly operating hanger support mechanism for a container on a guide rail in an item having a housing such as a desk or cupboard.

It is also an object of the present invention to provide an actuating means which extends an item from a first position to a second position by moving the actuating member only a fraction of the distance moved by the container.

A better understanding of these and other objects of the present invention will become apparent upon a reading of the following description when read in conjunction with the accompanying drawings.

BRIEF DESCRIPTION OF THE DRAWINGS

FIG. 4 is a partial fragmentary, partial section side view of the apparatus of the present invention with the actuating rod shown in phantom within the guide rail;

FIG. 5 is a partial sectional side view of the telescoping mounting support of the invention;

FIG. 6 is a sectional front view of the guide rail, universal mechanism, and roller bearings of the present invention; and FIG. 7 is a side view of the guide rail of the present invention showing an alternative embodiment.

DESCRIPTION OF THE PREFERRED EMBODIMENT

Figure 1:
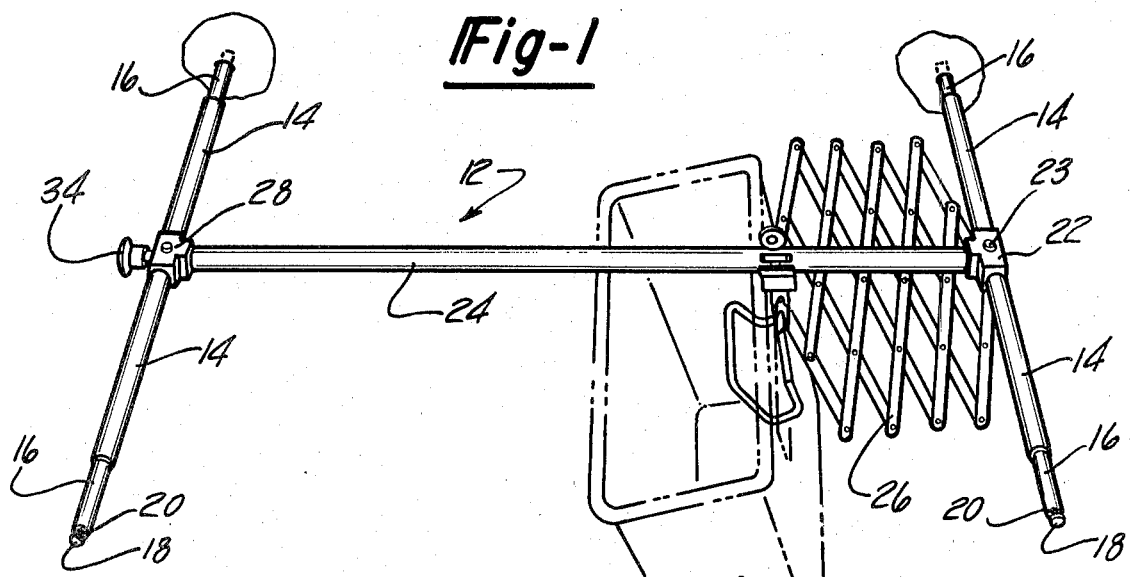
FIG. 1 is a perspective view from above of the apparatus and mounting structure of the present invention showing the container and trivet mechanism in a recessed position.
Figure 2:
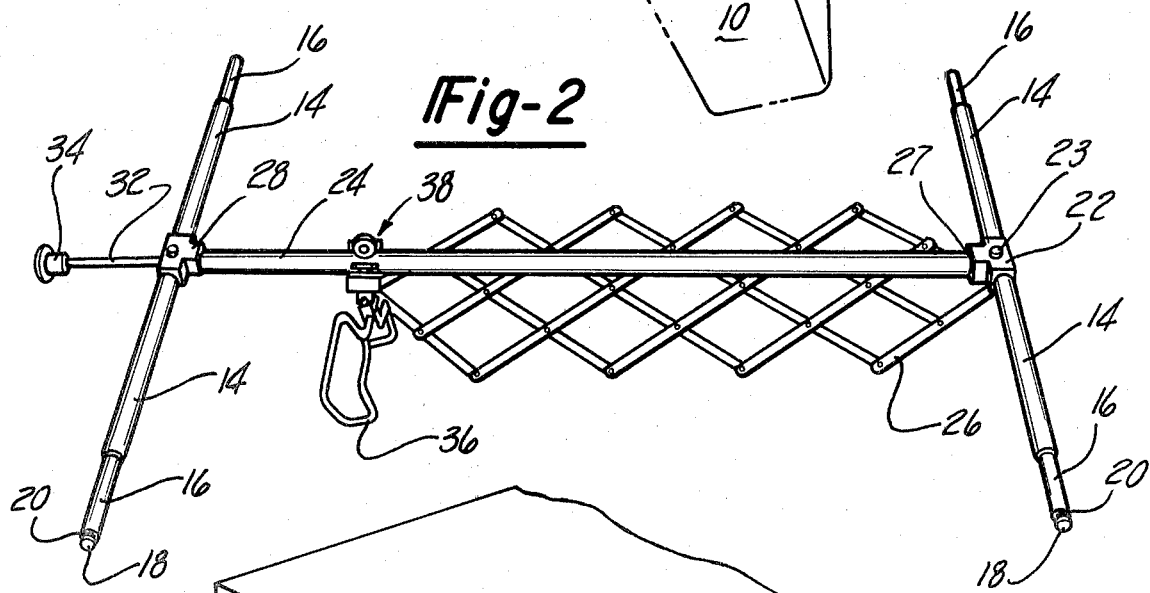
FIG. 2 is a similar view of the apparatus and mounting structure of the invention but showing the trivet mechanism and container support in a position extended somewhat from the recessed position of FIG. 1, but not fully extended.

FIGS. 1 and 2 show the preferred embodiment of the present invention as it would be positioned in a desk or cupboard to move a container between a recessed position and a forward position. A wastebasket 10 is used as a typical example of a container for this preferred embodiment.

The apparatus 12 of the invention consists of four mounting legs 14 which telescope with extension 16 (or additional extensions) to accommodate housings of various widths. The ends of the outmost extension 16 of the mounting legs 14 are formed as button-shaped supports 18 adjacent a reduced diameter portion 20. In a desk, cupboard, or suitable other framework having a housing appropriate for the apparatus of the present invention, the button-shaped members 18 are inserted through a hole in the side panels of the housing.

The reduced diameter areas 20 support the weight of the apparatus on the material of the side panels. Such a construction is especially appropriate for sturdy steel or heavy wood walls of a housing. Of course, the axial length of the reduced diameter portions 20 may be designed at various widths to accommodate the width of the wall materials wherein the buttons 18 are inserted. If the walls of the housing are not suitable for supporting the weight of the apparatus and/or the container, then other mounting adapters may be provided to accommodate the housing requiring such adapters.

The arrangement of mounting legs 14 and the button like tips 18 are shown as inserted in a wall 21 in FIG. 5.

A connecting bracket 22 is provided at the rearward end of guide rail 24. A bolt 23 is secured through bracket 22 to fasten the rear end of a trivet mechanism 26 to bracket 22. It should be noted that mounting legs 14 adjacent bracket 22 may be formed from an integral piece disposed through the mounting bracket. The guide rail 24 is disposed in a receiving hole 27 adapted to securely fasten it therein. A bracket 28 is provided at the opposite end of guide rail 24 to similarly receive the mounting legs 14.

Figure 3:
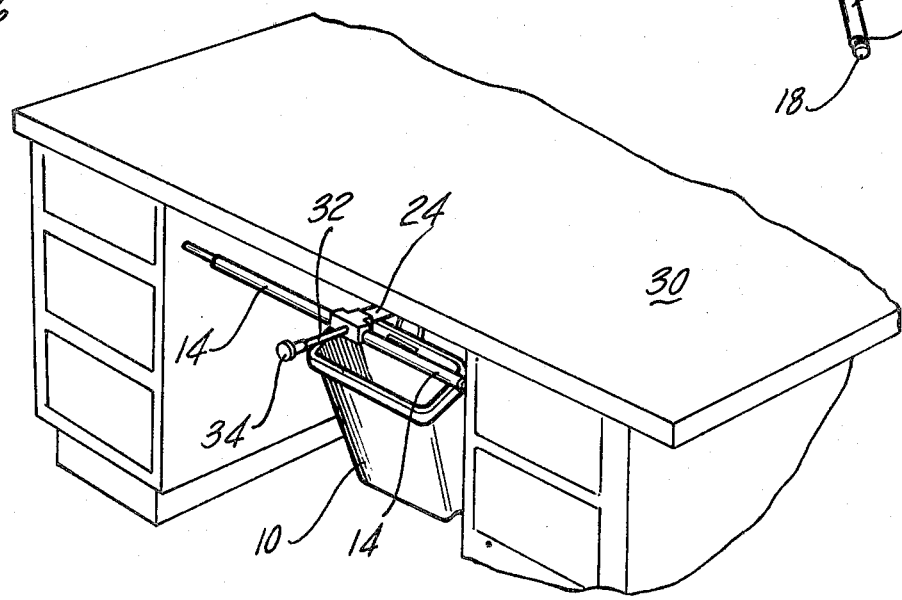
FIG. 3 is a partial perspective view of a desk having the apparatus of the present invention mounted therein with a wastebasket suspended from the hanger apparatus of the invention.

Referring now to FIG. 3, the forward mounting legs 14 are thereshown mounted in the wall panels of the recessed housing of a desk. Guide rail 24 extends to the rear of the housing of the desk 30. A commonly shaped wastebasket 10 is also shown in FIG. 3 in its normally oriented position.

Actuating rod 32 with its knob 34 is shown in FIGS. 2 and 3 in a partially extended position which draws the wastepaper basket carrier 36 to a position intermediate the rear of the housing and the front of the housing of the desk, for example.

Referring again to FIG. 2, the trivet mechanism 26 is not only affixed to bolt 23 at the rear portion of the apparatus support but is also affixed to a traveling roller carrier referred to generally as reference numeral 38. The roller carrier 38 supports basket bracket 36 and rides along guide rail 24 as depicted in FIGS. 1 and 2. The traveling roller carrier is self-centering on guide rail 24 and rolls smoothly therealong regardless of the position of the load in a basket 10 or similar container.

Referring now to FIG. 4, the apparatus of the present invention is thereshown in a segmented view. The trivet mechanism 26 is attached not only to the carrier mechanism 38 and bolt 23 but to actuating rod 32 as well. The trivet mechanism is attached to actuating rod 32 by means of a pin 40 disposed through two crossing members of the trivet mechanism 26 at their intersection. The pin 40 is rigidly connected to actuating rod 32 and riveted or otherwise secured to the trivet mechanism 26.

As can readily be seen, the actuating rod 32 may be moved axially within guide rail 24 to vary the position of pin 40 and thereby open or close the rearmost trivet section 42. Since the trivet sections are interconnected in the usual manner, all of the sections of the trivet mechanism open and close according to the position of the rearmost section. Thus, movement of the actuating rod 32 from the position shown in FIG. 1 to the position shown in FIG. 2 extends the trivet mechanism a multiple of five times the distance moved by the actuating rod for a trivet mechanism having five sections as shown in FIG. 2. Of course, for a trivet mechanism with a greater number of sections, a greater number of sections expand and the carrier 38 with hanger 36 is extended a greater distance. Practical limits are reached for the size of the trivet mechanism according to the housing of the desk or cabinet wherein the apparatus of the present invention is used. Of course, too many sections in the trivet mechanism would add to the overall weight and complication of the device as well as increasing the pressure required on the actuating rod 32 to extend the carrier 38 and hanger 36.

A longitudinal axial slot 39 is formed on the bottom of guide rail 24 at the rear end thereof to allow free movement of pin 40 connecting the trivet section to rod 32.

Referring now to FIGS. 4 and 6, the carrier mechanism and hanger 36 will be explained in greater detail. Carrier mechanism 38 has a pair of opposed rollers 44 riding on guide rail 24 so as to support bracket 46 thereabout. As best shown in FIG. 6, the rollers 44 are spaced apart and radially aligned with respect to the guide rail 24 so as to ride along the axis of the guide rail 24 and thereby prevent side wall climbing of the rollers or jumping from the rail. Bracket 46 in turn supports a universal mechanism 48 as well as the forward end 50 of the trivet mechanism 26.

Universal mechanism 48 has an upper section 52 as well as a lower section 54 joined by a universal ball joint 56. Ball joint 56 is rotatably pinned to upper section 52 by pin 58 disposed through the universal mechanism in a direction axial to guide rail 24. Similarly, bottom section 54 of universal joint 48 is rotatably pinned at 60 in a direction perpendicular to pin 58. Any equivalent means for the universal mechanism shown in FIGS. 4 and 6 is suitable for the invention so long as the basket is free to reorient its tilt relative to the hanger 36 in accordance with the items deposited in basket 10. Of course, basket 10 has an opening 62 to receive hanger 36 as shown in FIG. 4. Furthermore, basket 10 may be another type of container which has pockets interior thereto which dictate the orientation of the basket according to the weight of the items in the pockets (not shown).

Universal mechanism 48 may be rigidly secured or integrally formed with bracket 46. Alternatively, the universal mechanism may be attached by a screw or other pin disposed through an opening 64 at the bottom bracket 46 as shown in FIG. 6. Of course, the screw or pin 66 must be suitably adapted to connect to the upper portion 52 of the universal mechanism 48. A supporting washer is shown at 68 to maintain the forward portion 50 of the trivet mechanism in a horizontal orientation adjacent the lower portion of bracket 46. This washer 68, as well as the trivet mechanism, may be disposed in a recessed diameter portion of upper portion 52 or affixed to bracket 46 by a connecting member 70 as shown in FIG. 6. Any means equivalent for supporting the trivet mechanism below guide rail 24 in a manner allowing orientation and travel of the basket as described above is suitable for the invention.

Many variations of the invention are possible in addition to this preferred embodiment which has been shown above. Additional variations includes a polytetrafluoroethylene sleeve 72 disposed around guide rail 24 as shown in FIG. 7. Also available for rolling the universal mechanism 48 and hanger 36 along the length of guide rail 24 is the wheel type roller shown in my U.S. Pat. No. 4,111,506, said roller being disposed above the guide rail but having the wheel vertically aligned to ride along the very top of the guide rail. Nevertheless, the embodiment shown in FIGS. 1, 2, 4, and 6 is preferred over such mechanisms because it allows easier movement of the carrier 38 along guide rail 24 by avoiding off-axis forces which can inhibit movement of the carrier mechanism 38.

In operation, the invention allows the user to withdraw the actuating rod 32 only a small distance to extend the basket carrier 38 from the rear to the front of the housing. Thus, a person sitting at a desk may move a wastebasket from a rearward position which is always out of the way to a position near the front of the desk by pulling actuating rod knob 34 only a short distance. In this manner, the person at the desk need not even get up but merely has to sit back somewhat to extend the basket and deposit trash into the basket now directly in front of the person. The minimal distance moved by the actuating rod does not require the person to get up.

Having described my invention, many modifications thereto will become apparent to those skilled in the art to which it pertains without deviating from the spirit of the invention as defined by the scope of the appended claims.

I claim:

1. An apparatus for moving a container between the front and rear of a housing, said apparatus comprising:
    a guide rail extending from the front to the rear of the housing;
    means for mounting said rail in the housing;
    means for supporting a container on said rail, said supporting means being movable between the front and rear of the housing;
    an actuating member connected to said rail and movable therealong;
    means fastened to said rail, said actuating member, and said supporting means for moving said supporting means a greater axial distance along said guide rail than the distance moved by said actuating member, whereby a container attached to said supporting means may be moved from the rear to the front of the housing by moving said actuating member only a portion of the distance therebetween.

2. The invention as defined in claim 1 wherein said moving means comprises a trivet mechanism having a first expansible section fastened to said rail at the rear of the housing, said trivet mechanism also having a series of expansible sections connected to said first section such that each section in said series opens and closes with said first section, the last section of said series being connected to said support means.

3. The invention as defined in claim 2 wherein said actuating member is attached to said first section such that movement of said actuating member along said rail moves said supporting means a multiple of the distance moved by said actuating means.

4. The invention as defined in claim 1 wherein said mounting means comprises front and rear support rods, each of said support rods telescoping to adjust for the width of the housing.

5. The invention as defined in claim 5 wherein each end of each support rod has a reduced diameter portion adjacent but not coinciding with said end of said rod so that said rod may be suspended from holes in the opposing walls of the housing.

6. The invention as defined in claim 1 wherein said supporting means comprises opposed rollers rolling atop said rail, said rollers being connected below said rail by a hanger so that said rollers remain spaced apart.

7. The invention as defined in claim 6 wherein the said supporting means further comprises means for supporting said rollers in a spaced apart relationship wherein each roller is radially aligned with respect to the axis of the guide rail.

8. The invention as defined in claim 7 wherein said hanger further comprises a universal joint.

9. The invention as defined in claim 1 wherein said supporting means comprises a slidable sleeve disposed around said rail and a hanger connected to said sleeve by a universal joint.

10. The invention as defined in claim 1 wherein said supporting means comprises a roller having a grooved rolling surface receiving said rail and a hanger pivotally connected to said roller.

11. An apparatus for moving a container between the front and rear of a housing, said apparatus comprising:
    a guide rail extending from the front to the rear of the housing;
    means for mounting said rail in the housing;
    means for supporting a container on said rail, said supporting means being movable between the front and rear of the housing;
    an actuating member connected to said rail and movable therealong;
    trivet means having a plurality of expansible sections, said trivet means fastened to said rail, said actuating member, and said supporting means for moving said supporting means a greater axial distance along said guide rail than the distance moved by said actuating member, whereby a container attached to said supporting means may be moved from the rear to the front of the housing by moving said actuating member only a portion of the distance therebetween;
    wherein said rail is hollow and has an axial slot near the rear of the housing and wherein said actuating member comprises:
    a rod coaxially slidably disposed in said rail;
    a pin connecting said rod and the first section of said trivet mechanism so as to support said trivet mechanism, said pin being slidable through said slot so as to expand and contract said first section by movement of said rod.

* * * * *

UNITED STATES PATENT AND TRADEMARK OFFICE
CERTIFICATE OF CORRECTION

PATENT NO. : 4,371,222
DATED : February 1, 1983
INVENTOR(S) : Mitchell F. Gorkiewicz It is certified that error appears in the above—identified patent and that said Letters Patent is hereby corrected as shown below:

Claim 5, line 1, delete "5" and insert --4--.

Signed and Sealed this

Thirty-first Day of May 1983

[SEAL]

Attest:

DONALD J. QUIGG

*Attesting Officer*  *Acting Commissioner of Patents and Trademarks*